United States Patent [19]
Haugwitz et al.

[11] 3,864,350
[45] Feb. 4, 1975

[54] PRIDYL-1H-BENZIMIDAZOLE N-OXIDES
[75] Inventors: Rudiger D. Haugwitz, Titusville; Venkatachala Lakshmi Narayanan, Hightstown, both of N.J.
[73] Assignee: E. R. Squibb & Sons, Inc., Princeton, N.J.
[22] Filed: Mar. 18, 1974
[21] Appl. No.: 452,245

[52] U.S. Cl. 260/294.8 C, 260/294.8 R, 260/295 K, 260/295 F, 260/296 B, 424/263
[51] Int. Cl. ........................... C07d 31/50
[58] Field of Search ............... 260/294.8 C, 309.2

[56] References Cited
UNITED STATES PATENTS
3,586,670  6/1971  Brenneisen et al. ............... 260/240
FOREIGN PATENTS OR APPLICATIONS
1,198,941  7/1970  Great Britain .................... 260/309.2
OTHER PUBLICATIONS
Brenneisen et al., Chem. Abstracts, Vol. 71, (13), 61,372k, Sept. 29, 1969.

*Primary Examiner*—Alan L. Rotman
*Attorney, Agent, or Firm*—Lawrence S. Levinson; Merle J. Smith

[57] ABSTRACT

New pyridyl-1H-benzimidazole N-oxides of the general formula

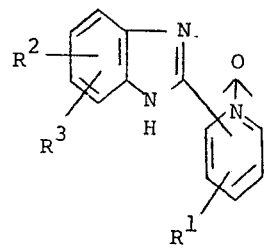

are useful in combatting tapeworms.

5 Claims, No Drawings

PRIDYL-1H-BENZIMIDAZOLE N-OXIDES

SUMMARY OF THE INVENTION

This invention relates to pyridyl-1H-benzimidazole-N-oxides having the formula

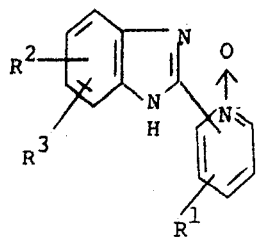

wherein $R^1$ and $R^3$ each is hydrogen or lower alkyl; $R^2$ is hydrogen, isothiocyanato, nitro or $-NHR^4$; and $R^4$ is hydrogen, lower alkyl, lower alkanoyl or carbo-lower alkoxy; and acid addition salts thereof.

These symbols have the same meanings throughout this application.

The lower alkyl groups referred to above are straight or branched chain hydrocarbon radicals of up to seven carbon atoms, e.g., methyl, ethyl, propyl, isopropyl, butyl, s-butyl and the like. The lower alkoxy groups are similar. The lower alkanoyl groups include the acyl radicals of the lower fatty acids of up to seven carbon atoms, e.g., acetyl, propionyl, butyryl, isobutyryl and the like. The radicals having up to four carbon atoms are preferred in each group, especially methyl and ethyl as the lower alkyl groups, acetyl as the lower alkanoyl group and isobutoxy as the lower alkoxy group. Preferred, from the point of view of position of attachment, are the 2-pyridyl and 3-pyridyl radicals, especially the first, with a lower alkyl group in the 6-position when substituted. The $R^2$ substituents are preferably in the 5- and 6-positions of the benzenoid ring, especially in the 5-position. Preferred are compounds wherein $R^1$ and $R^3$ each is hydrogen, $R^2$ is isothiocyanato or $-NHR^4$, $R^4$ is hydrogen, lower alkanoyl or carbo-lower alkoxy (with the pyridine ring attached by the 2-position) especially those compounds wherein $R^2 = -NCS$, $R^1 = H$, $R^3 = H$; $R^2 = -NH_2$, $R^1 = H$, $R^2 = H$;

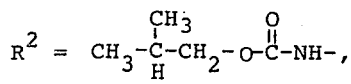

$R^2 = H$, $R^3 = H$;

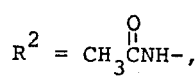

$R^1 = H$, $R^3 = H$.

DETAILED DESCRIPTION OF THE INVENTION

The new compounds of formula I are produced by oxidizing a compound of the formula

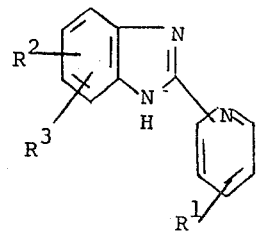

with oxidizing agents like peroxy acids, such as perbenzoic acid, m-chloroperoxybenzoic acid, or with mono-perphthalic acid, monopermaleic acid or the like, utilizing a halogenated hydrocarbon like chloroform or organic solvent like ether or ether of ethylene glycol as the reaction medium. Hydrogen peroxide may also be utilized, using glacial acetic acid as the preferred solvent. The oxidation is effected within a temperature range of about 0° – 85°C.

When $R^2$ is amino, it is desirable to protect the amino group, e.g., by acylation, for example with acetic anhydride, oxidizing as described above, then if desired removing the acyl group by hydrolysis.

The compounds of formula I form acid addition salts by reaction with a variety of inorganic and organic acids, of which the physiologicallly acceptable members are preferred, providing acid addition salts including, for example, hydrohalides (especially hydrochloride and hydrobromide), sulfate, nitrate, borate, phosphate, oxalate, tartrate, maleate, citrate, acetate, ascorbate, succinate, benzenesulfonate, methanesulfonate, cyclohexanesulfamate and toluenesulfonate. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base. Other salts may then be formed from this by reaction with an equivalent of acid.

The compounds of this invention are useful as antelmintics, e.g., to combat infestations by tapeworms. The compounds are useful at a dosage range of about 50 to 200 mg./kg. A compound of formula I or mixture thereof, or acid addition salt thereof may be given to an animal infested with the helminths, e.g., household animals, sheep or the like, in a conventional dosage form such as tablet, bolus, or the like, compounding the active ingredient with carriers, excipients, flavors, etc. according to accepted veterinary practice.

The following examples are illustrative of the invention which are preferred embodiments and serve as models for the preparation of additional members of the class. Temperatures are in degrees celsius.

EXAMPLE 1

2-(2-Pyridyl-1H-Benzimidazole, N-Oxide 5.0 g. (0.025 mole) of 85% m-chloroperoxybenzoic acid is added to a solution of 5.0 g. (0.025 mole) of 2-(2-pyridyl)benzimidazole benzimidazole in 250 ml. of chloroform and the mixture is stirred at room temperature for two hours. The solvent is removed in vacuo and the residue is chromatographed on alumina (Act. IV, Woelm, neutral). Elution with chloroform yields the product which is crystallized from chloroform to yield 2.9 g., m.p. 229°–231°.

EXAMPLE 2

2-(3-Pyridyl)-1H-Benzimidazole, N-Oxide 5.0 g. (0.025 mole) of 2-(3-pyridyl)benzimidazole is dissolved in chloroform and 5.0 g. (0.025 mole) of 85% m-chloroperoxybenzoic acid is added. The mixture is stirred at room temperature for two hours and the solvent is removed in vacuo. The residue is heated on the steam bath in excess sodium carbonate solution for 0.5 hours. The mixture is cooled, filtered and the filter cake washed with water. The solid is crystallized from absolute ethanol to yield 2.1 g. of product, m.p. 309°–310°.

EXAMPLE 3

2-(6-Methyl-2-Pyridyl)-1H-Benzimidazole, N-Oxide 5.0 g. (0.025 mole) of m-chloroperoxybenzoic acid is added to a solution of 5.0 g. (0.025 mole) of 2-(6-methyl-2-pyridyl)-1H-benzimidazole in 100 ml. of chloroform and the mixture is stirred at room temperature for one hour. Then an additional 2.0 g. of m-chloroperoxybenzoic acid is added and the mixture is stirred for 1 hour. The solvent is removed in vacuo. The residue is treated with saturated sodium carbonate, and filtered. The solid is filtered off, dried and crystallized from chloroform to yield 2.5 g. of product, m.p. 245°–247°.

EXAMPLE 4

5-Acetylamino-2-(2Pyridyl)Benzimidazole, N-Oxide a. To 4.2 g. of 5-amino-2-(2-pyridyl)benzimidazole, dissolved in 40 ml. of pyridine there is added 2.3 g. of acetic anhydride. On standing the amide precipitates and is filtered off and washed with ether to yield 4.7 g. of 5-acetylamino -2-(2-pyridyl)benzimidazole, m.p. 250°–252°.

b. To 2.5 of 5-acetylamino-2-(2-pyridyl)benzimidazole dissolved in 300 ml. of acetonitrile there is added 2.2 g. of m-chloroperoxybenzoic acid (85%). The mixture is stirred for 3 hours. The solvent is evaporated and to the residue there is added sodium carbonate solution. The resulting solid is filtered off and crystallized from ethyl acetate, to yield the product, 5-acetylamino-2-(2-pyridyl)-benzimidazole, N-Oxide.

EXAMPLE 5

5-Amino-2-(2-Pyridyl)Benzimidazole, N-Oxide, Hydrochloride

A mixture of 5-acetylamino-2-(2pyridyl)benzimidazole, N-Oxide and 14 ml. of concentrated hydrochloric acid is refluxed for 10 minutes. The resulting solid is filtered off and washed with a small amount of ethanol to yield 5-amino-2-(2-pyridyl)benzimidazole, N-oxide, hydrochloride.

EXAMPLE 6

5-Isothiocyanato-2-(2-Pyridyl)Benzimidazole, N-Oxide — Method A

To a mixture of 1.4 g. of 5-amino-2-(2-pyridyl)-benzimidazole, N-oxide, hydrochloride, 20 ml. of chloroform, 10 ml. of water and 2 g. of calcium carbonate there is added with stirring 0.35 ml. of thiophosgene. After 1 hour of stirring the mixture is filtered, the organic layer separated, dried and evaporated to yield the product. The filter cake is extracted with ethyl acetate. Upon evaporation additional product is isolated. Total yield 1 g., m.p. 241°–244°.

EXAMPLE 7

5-Isothiocyanato-2-(2-Pyridyl)Benzimidazole, N-oxide —Method B

To a solution of 5.0 g. (0.02 mole) of 5-isothiocyanato 2-(2-pyridyl)benzimidazole in chloroform is added 5.0 g. of m-chloroperoxybenzoic acid and the mixture is stirred at room temperature for 2 hours. An additional 2.0 g. of m-chloroperoxybenzoic acid is added and the mixture is stirred for 2 more hours. The solvent is removed in vacuo and the residue is chromatographed on alumina (Act. IV, Woelm). Elution with chloroform yields the product which is crystallized from chloroform to give 0.4 g., m.p., 241°–244°.

EXAMPLE 8

2-Methylpropyl Ester of [2-Pyridyl)-1H-Benzimidazole-5-yl]Carbamic Acid, N-Oxide To a solution of 1.0 g. of the 2-methylpropyl ester of [2-(2-pyridyl)-1H-benzimidazole5-yl]carbamic acid in ethylene glycol dimethyl ether there is added 0.67 g. of m-chlorperoxybenzoic acid and the mixture is stirred at room temperature for 2 hours. The solvent is removed in vacuo and the residue is treated with aqueous potassium carbonate. The aqueous layer is extracted with chloroform. The organic layer is dried (MgSO$_4$) and the chloroform is removed in vacuo. The residue is crystallized from chloroform-ether to yield 0.5 g. of the product, m.p. 203°–205°.

EXAMPLE 9

4-(and 6-)Isothiocyanato-5-Methyl-2-(2-Prydyl)-1H-Benzimidazole, N-Oxide a. 5-Methyl-2-(2-pyridyl)-1H-benzimidazole A mixture of 3,4-diaminotoluene (24.4 g., 0.2 mole), picolinic acid (24.6 g., 0.2 mole) and polyphosphoric acid (350 g.) is heated under a nitrogen atmosphere at 200° for 3 hours. The mixture is then cooled to 100° and slowly poured into 1.5 liter of water with rapid stirring. Upon cooling to room temperature, the product separates as a grayish solid, yielding 39.1 g. (93%) of 5-methyl-2-(2-pyridyl)-1H-benzimidazole, m.p. 178°–180°.

b. 4-(and 6-)Nitro-5-methyl-2-(2-pyridyl)-1H-benzimidazole

A mixture of 5-methyl-2-(2-pyridyl-1H-benzimidazole (31.35 g., 0.15 mole) and 200 ml. of sulfuric acid is cooled to 0°–5° in an ice-bath and a mixture of nitric acid (10.5 ml., sp. gr. 1.42, 0.15 mole) and sulfuric acid (40 ml.) is then slowly added maintaining the temperature between 0°–10°. After completing the addition, the mixture is allowed to warm to room temperature and stirring for two hours. The reaction mixture is poured into 500 ml. of ice water and neutralized with 50% NaOH solution, maintaining the temperature below 25°. The precipitated material is collected, washed with water and crystallized from acetonitrile yielding 28.6 g. (76%) of 4-(and 6-)nitro-5-methyl-2-(2-pyridyl)-1H-benzimidazole, m.p. 168°–172°.

c. 4-(and 6-)Isothiocyanato-5-methyl-2-(pyridyl)-1H-benzimidazole

A suspension of 4-(and 6-)nitro-5-methyl-2-(2-pyridyl)-1H-benzimidazole (10.1 g., 0.04 mole) and platinum oxide (1.0 g.) in 150 ml. of ethanol is hydrogenated at 40 psi over a period of 2 hours. The catalyst is removed by filtration and the ethanol removed under vacuum yielding 7.8 g. (87%) of the amine intermediate as an oil (i.r. 301 μ and 3.12 μ).

A mixture of the amine (7.8 g. 0.035 mole), calcium carbonate (7.0 g. 0.07 mole) ethylene glycol dimethyl ether (200 ml.) and water (50 ml.) is cooled to 10° in an ice-bath and thiophosgene (4.02 g., 0.035 mole) is added. The mixture is allowed to warm slowly to room temperature and stirred overnight. The insoluble material is removed by filtration and the ethylene glycol dimethyl ether removed under vacuum at 25°. A dark oil separates from the reaction mixture which is taken up in chloroform, dried over anhydrous MgSO$_4$, and the chloroform is removed under vacuum yielding a highly viscous oil (i.r. — NCS 4.84 μ). The oil is then passed through an alumina column with petroleum ether/ether (1:1) and upon evaporation of the solvent yields a light yellow oil. The oil crystallizes under high vacuum over a period of 18 hours, yielding 6.8 g. (73%) of a mixture of isomers of 4-(and 6-)isothiocyanato-5-methyl-2-(2-pyridyl)-1H-benzimidazole m.p. 140°–158°. Silica gel/ether (R$_f$=0.24 and 0.40).

d. 4-(and 6-)Isothiocyanato-5-methyl-2-(2-pyridyl)-N-oxide

Following the procedure of Example 7 and substituting 4-(and 6-)isothiocyanato-5-methyl-2-(2-pyridyl)-1H-benzimidazole for the 5-isothiocyanato-2-(2-pyridyl)benzimidazole, 4-(and 6-)isothiocyanato-5-methyl-2-(2-pyridyl)-1H-benzimidazole, 4-(and 6-) isothiocyanato-5-methyl-2-(2-pyridyl)-1 H-benzimidazole N-oxide is obtained.

What is claimed is:
1. A compound of the formula

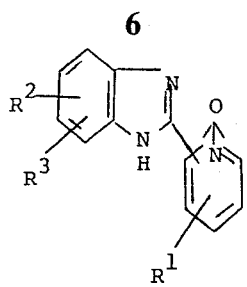

wherein R$^1$ and R$^3$ each is hydrogen or lower alkyl; R$^2$ is isothiocyanato; and acid physiologically acceptable acid addition salts thereof.

2. A compound of the formula

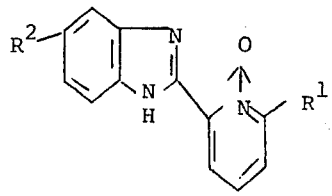

wherein R$^1$ and R$^2$ have the same meaning as in claim 1.

3. A compound of the formula

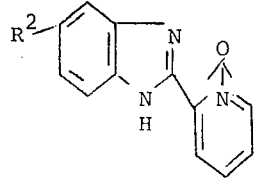

wherein R$^2$ is isothiocyanato.

4. A compound as in claim 1 wherein R$^1$ and R$^3$ each is hydrogen.

5. A compound as in claim 1 wherein R$^1$ is methyl and R$^3$ is hydrogen.

* * * * *

UNITED STATES PATENT OFFICE
CERTIFICATE OF CORRECTION

PATENT NO. : 3,864,350
DATED : February 4, 1975
INVENTOR(S) : Rudiger D. Haugwitz, Venkatachala Lakshmi Narayanan It is certified that error appears in the above-identified patent and that said Letters Patent are hereby corrected as shown below:

Column 4, line 20 after [2- insert -- (2- --
Column 5, line 25 after (2-pyridyl)- insert -- 1H-benzimidazole- --
Column 5, lines 31-33 delete "4-(and 6-)isothiocyanato-5-methyl-2-(2-pyridyl)-1H-benzimidazole"

Signed and Sealed this

Seventh Day of December 1976

[SEAL]

Attest:

RUTH C. MASON
Attesting Officer

C. MARSHALL DANN
Commissioner of Patents and Trademarks